United States Patent
Ihara

(10) Patent No.: US 7,202,837 B2
(45) Date of Patent: Apr. 10, 2007

(54) INFORMATION OUTPUT APPARATUS

(75) Inventor: Shoji Ihara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 489 days.

(21) Appl. No.: 10/685,715

(22) Filed: Oct. 15, 2003

(65) Prior Publication Data

US 2004/0174374 A1    Sep. 9, 2004

(30) Foreign Application Priority Data

Oct. 22, 2002   (JP)   .............................. 2002-307270

(51) Int. Cl.
   *G09G 5/00*   (2006.01)
(52) U.S. Cl. ............................. 345/1.1; 346/6; 346/419
(58) Field of Classification Search ................ 345/204, 345/695–698, 6, 32, 419, 531, 1.1
   See application file for complete search history.

(56) References Cited

U.S. PATENT DOCUMENTS

| | | | | |
|---|---|---|---|---|
| 3,555,349 A | * | 1/1971 | Munz | 315/383 |
| 6,189,246 B1 | * | 2/2001 | Gorthala | 40/446 |
| 6,275,241 B1 | * | 8/2001 | Tanaka | 345/531 |
| 6,462,840 B1 | * | 10/2002 | Kravtsov | 358/474 |
| 6,479,929 B1 | * | 11/2002 | Knabenbauer | 313/484 |
| 6,847,354 B2 | * | 1/2005 | Vranish | 345/173 |

FOREIGN PATENT DOCUMENTS

| | | |
|---|---|---|
| JP | 5-216568 | 8/1993 |
| JP | 2000-148393 | 5/2000 |

* cited by examiner

*Primary Examiner*—Regina Liang
(74) *Attorney, Agent, or Firm*—Cowan, Liebowitz & Latman, P.C.

(57) ABSTRACT

This invention provides an information output apparatus which outputs tactile information or the like corresponding to the surface state of an object as three-dimensional information together with image information, and allows the user to easily discriminate the surface material or the like of an image object in the image information.

A hybrid display unit of the information display apparatus of this invention has a structure formed by overlaying, e.g., a display panel used to display an image, and an unevenness output element group used to output the unevenness level of that image, and voltage values to be applied to respective unevenness output elements of the unevenness output element group are determined on the basis of, e.g., unevenness information stored in a memory. Therefore, material differences (smooth or rough touch) of images displayed on the display panel can be felt by touching unevenness output by the unevenness output elements.

4 Claims, 14 Drawing Sheets

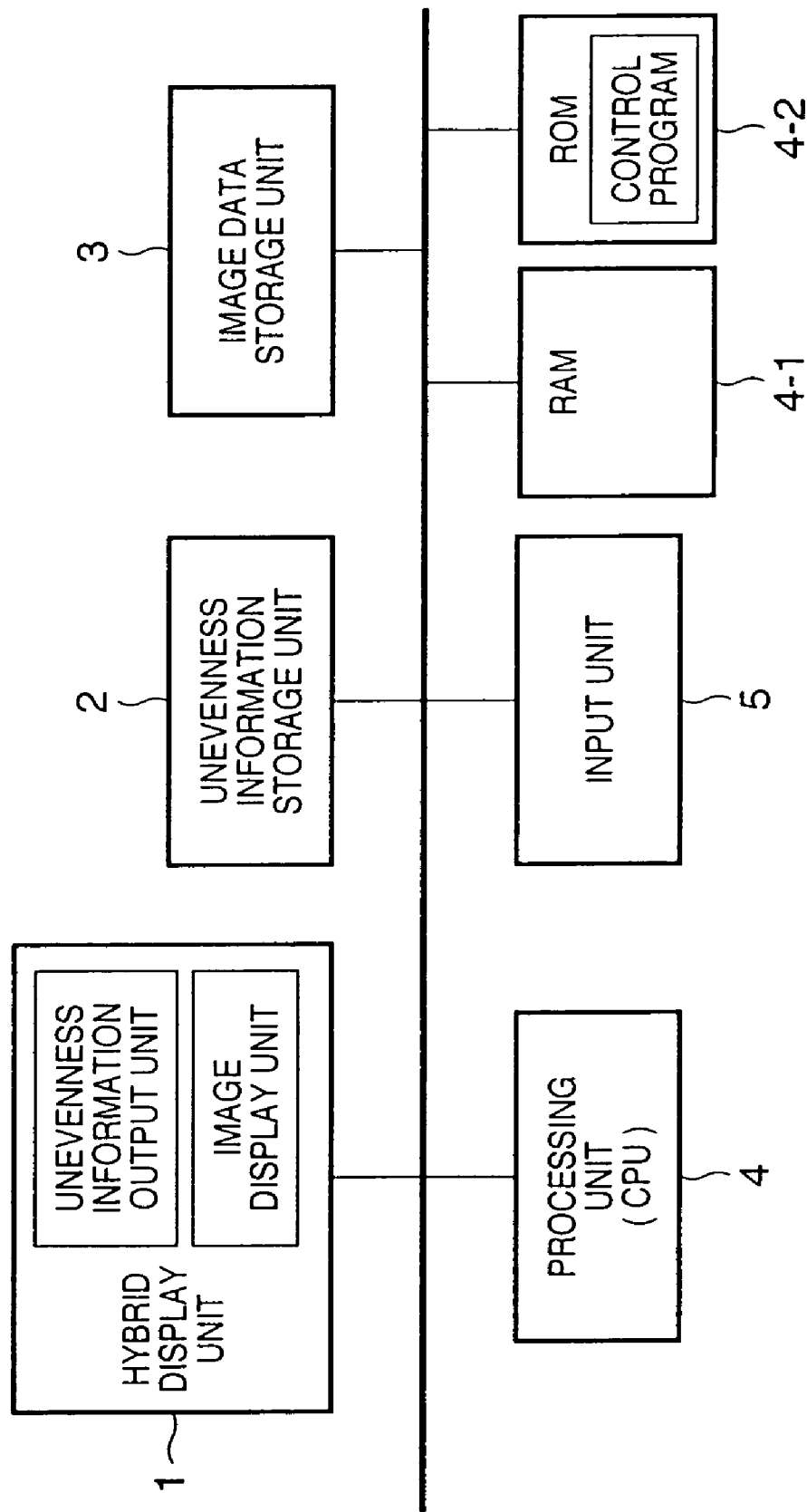

| 1 | 0 | 1 | 0 |
|---|---|---|---|
| 1 | 0 | 1 | 0 |
| 1 | 0 | 1 | 0 |
| 1 | 0 | 1 | 0 |

27b

| 1 | 1 | 1 | 1 |
|---|---|---|---|
| 0 | 0 | 0 | 0 |
| 1 | 1 | 1 | 1 |
| 0 | 0 | 0 | 0 |

27c

| 2 | 2 | 0 | 0 |
|---|---|---|---|
| 2 | 2 | 0 | 0 |
| 0 | 0 | 2 | 2 |
| 0 | 0 | 2 | 2 |

27d

| 0 | 0 | 0 | 0 |
|---|---|---|---|
| 0 | 0 | 0 | 0 |
| 0 | 0 | 0 | 0 |
| 0 | 0 | 0 | 0 |

INFORMATION OUTPUT APPARATUS

FIELD OF THE INVENTION

The present invention relates to an information output apparatus which allows the user to accurately identify the uneven shape of an object surface via visual sense and tactile sense, and provides texture impression, which is hard to express by a conventional technique, as information.

BACKGROUND OF THE INVENTION

When the user searches the Internet, CD-ROM, or the like for a target product, and wants to visually confirm it, the image, color, and the like of the product can be clearly displayed on a color display. However, the uneven shape of the product surface can be expressed to some extent on an image by, e.g., shading upon taking its picture, but the uneven shape that can be identified on the color display is far from satisfactory. For this reason, it is nearly impossible to accurately examine material impression such as an uneven shape and the like.

As a method of three-dimensionally reconstructing the uneven shape of an object, and outputting the reconstructed shape to be identifiable by the user, a technique that transmits tactile information to the user by pressure actuators which are arranged in an array on a silicon substrate (Japanese Patent Laid-Open No. 5-216568), and a technique that transmits tactile information such as unevenness information to the user by three-dimensionally deforming or vibrating a piezoelectric sheet (Japanese Patent Laid-Open No. 2000-148393) are known.

However, the invention disclosed in Japanese Patent Laid-Open No. 5-216568 arranges the actuators on the silicon substrate to express tactile information but does not consider image display at all. Hence, tactile information such as unevenness information or the like cannot be output to be superposed on image display. For this reason, it is impossible for this method to display an image and its unevenness information as combined information.

Japanese Patent Laid-Open No. 2000-148393 describes an invention relating to an output apparatus which presents tactile information such as unevenness, vibrations, and the like to be superposed on image display using a transparent piezoelectric material. However, with this method, tactile information is obtained as follows. That is, the second derivative of luminance of a displayed image is calculated, contour information of the image is acquired by extracting the second derivative of luminance, and the inner and outer portions of the contour are merely output as differences of unevenness. Hence, this method cannot finely output the texture shape of the displayed object surface. Therefore, it is impossible for both the conventional methods to output texture impression based on the uneven shape of an object together with an image of that object.

SUMMARY OF THE INVENTION

The present invention has been made in consideration of the above problems, and has as its object to provide an information output apparatus which outputs tactile information or the like corresponding to the surface state of an object as three-dimensional information together with image information, and allows the user to easily discriminate the surface material or the like of an image object in the image information.

In order to achieve the above object, an information output apparatus according to the present invention comprises a display panel for displaying an image, an unevenness output element group which is arranged to be in contact with a surface of the display panel, and displays an unevenness level of the image, a memory for storing unevenness information of the image, and a control unit for controlling the unevenness level of the image by controlling voltage values to be applied to the unevenness output elements within a region of the image displayed on the display panel on the basis of the unevenness information of the image stored in the memory.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a block diagram showing the system arrangement according to the first embodiment of the present invention;

FIG. 11 illustrates an example of uneven pattern data;

DETAILED DESCRIPTION OF THE PREFERRED EMBODIMENTS

Figure 2A:
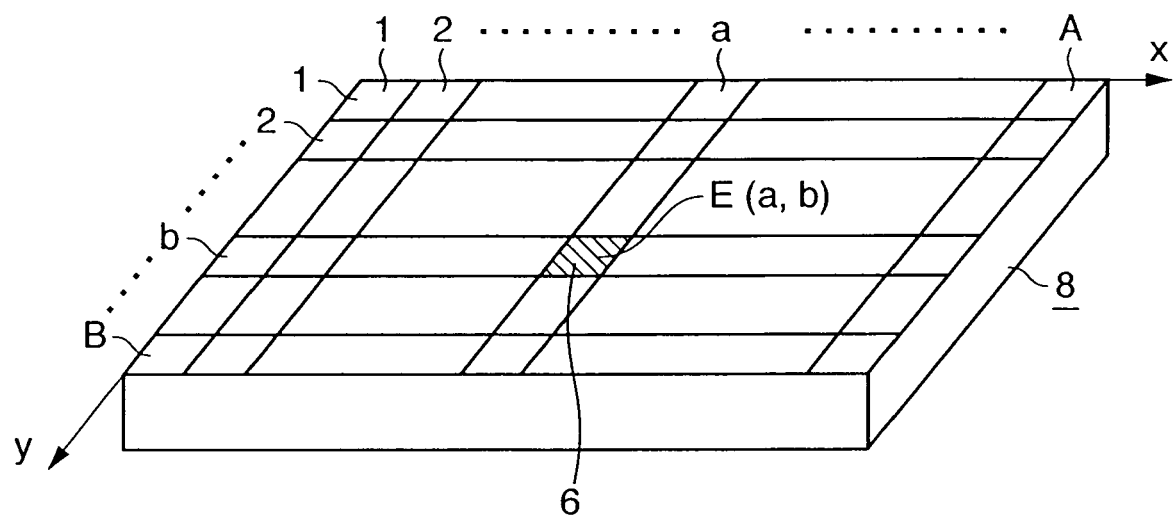
FIG. 2A is a perspective view of an unevenness information output unit.

Preferred embodiments of the present invention will now be described in detail in accordance with the accompanying drawings.

<First Embodiment>

FIG. 1 is a block diagram showing the system arrangement of an information output apparatus according to the first embodiment of the present invention. Reference numeral 1 denotes a hybrid display unit which will be described in detail later. The hybrid display unit 1 has an unevenness information output unit, and an image display unit which can display an image to be superposed on the output from the unevenness information output unit. Reference numeral 2 denotes an unevenness information storage unit which is used to store unevenness information (unevenness information table) expressed by numerical value data (to be described later), and comprises a normal storage device. Reference numeral 3 denotes an image data storage unit which stores image data. Reference numeral 4 denotes a processing unit (CPU) which executes a process for outputting unevenness information (to be described later) and the like. Reference numeral 5 denotes an input unit. Reference numeral 4-2 denotes a ROM which stores various control program; and 4-1, a RAM. The processing unit 4 executes a process shown in FIG. 7 and the like while controlling respective units using the RAM 4-1 on the basis of a control program stored in the ROM 4-2.

FIG. 2A is a perspective view of the unevenness information output unit. An unevenness information output unit 8 has a rectangular shape defined by arranging A unevenness output elements 6 in the horizontal (x-axis) direction and B elements in the vertical (y-axis) direction in a matrix. Each unevenness output element 6 can be independently applied with a voltage using a state-of-the-art technique. The voltage to be applied to each unevenness output element 6 can be selectively set in multiple levels (two or more levels).

Each unevenness output element 6 deforms to a convex shape upon application of the voltage. In the following description, a voltage level that can deform the unevenness output element 6 to a convex shape will be referred to as an unevenness level. In this embodiment, three unevenness levels 0, 1, and 2 of the unevenness output element 6 can be set. That is, let E(a, b) be the unevenness output level of the unevenness output element 6 which is located at the a-th position in the x-axis direction and b-th position in the y-axis direction. Then, E(a, b)=0, 1, or 2.

Figure 2B:
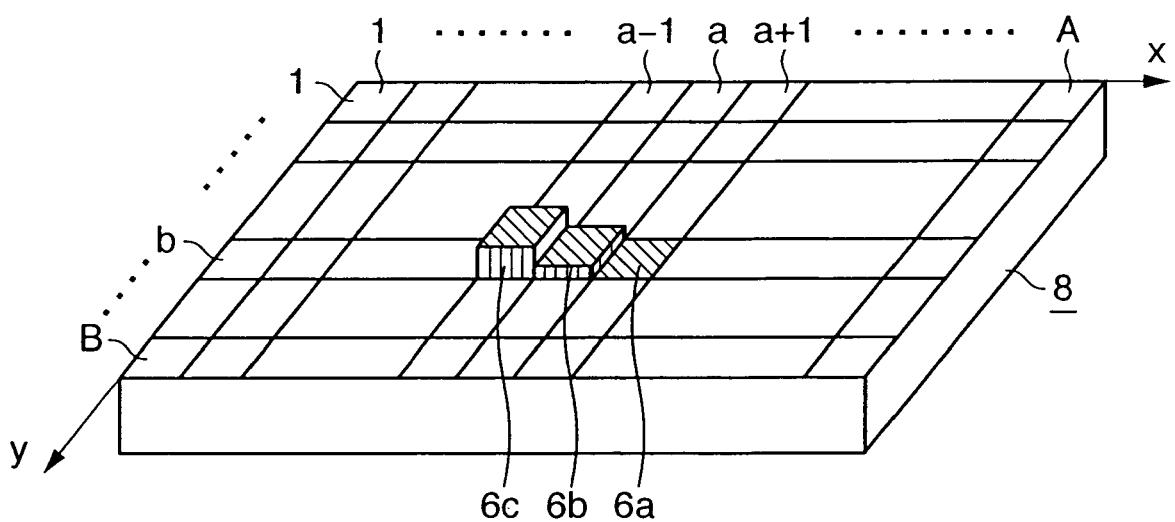
FIG. 2B shows the states of respective unevenness output elements upon application of respective unevenness output levels (0 to 2)

FIG. 2B shows the shapes of the unevenness output elements 6 upon application of unevenness output levels 0 to 2. Reference numerals 6a, 6b, and 6c denote the shapes of the unevenness output elements 6 when the unevenness output levels are respectively 0, 1, and 2. As can be seen from FIG. 2B, the shape 6a (E(a+1, b)=0) at level 0 indicates the basic state of the unevenness output element 6 and does not deform. However, the shape 6b (E(a, b)=1) at level 1 deforms a predetermined amount (this amount is assumed to be 1) upward in a convex pattern, as shown in FIG. 2B. The shape 6c (E(a−1, b)=2) at level 2 deforms in a convex pattern by an amount twice that at level 1. Such unevenness output element 6 can be formed by a state-of-the-art technique using an actuator and the like.

As another embodiment of the unevenness information output unit 8, the present invention may use an unevenness information output unit in which a cantilever is formed by lead zirconate titanat, and its shape is controlled by an electrode to deform in multiple convex patterns, and which allows an image to be seen through if it is overlaid on a display device such as a liquid crystal display.

Figure 3A:
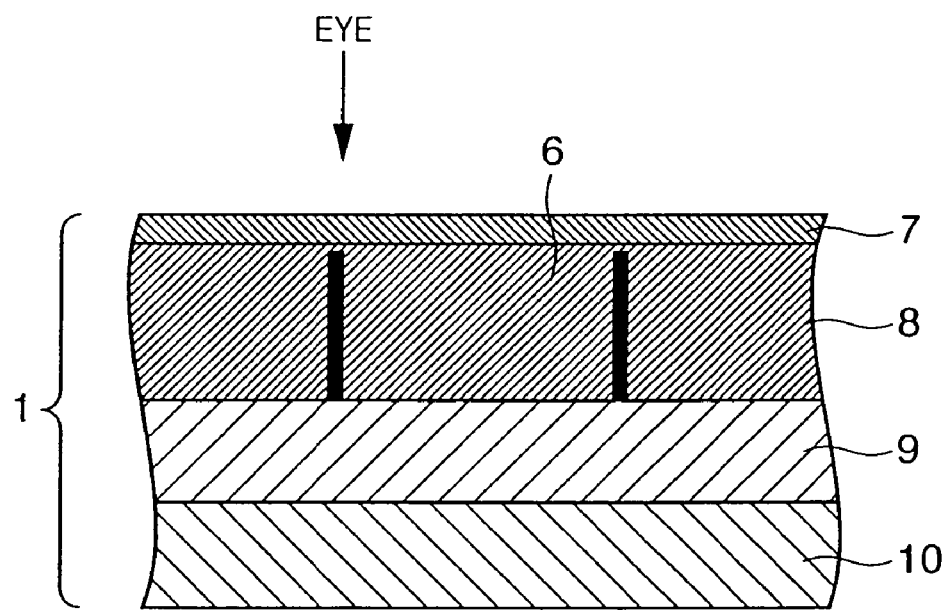
FIGS. 3A and 3B are schematic sectional views showing an example of a hybrid display unit.
Figure 3B:
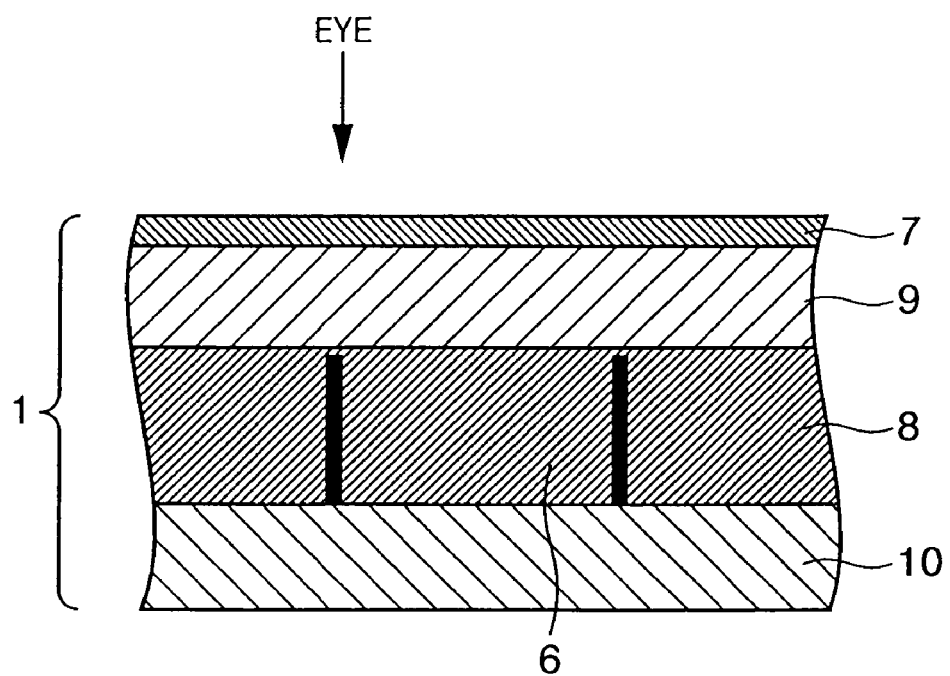

FIGS. 3A and 3B are schematic sectional views of the hybrid display unit 1. The user observes image information output to the hybrid display unit 1 from the direction indicated by the arrow in FIGS. 3A and 3B. In FIGS. 3A and 3B, reference numeral 7 denotes a transparent protection layer which protects the output surface of the unevenness information output unit 8 from dust and scratches; 8, the unevenness information output unit (unevenness output elements) viewed from a direction perpendicular to the stacking direction; 6, the unevenness output elements; 9, an image display unit (display layer, display panel) formed of a liquid crystal and the like; and 10, a support layer used to maintain the mechanical strength of the hybrid display unit 1. Two different structures shown in FIGS. 3A and 3B are available depending on the positional relationship between the image display unit 9 and unevenness information output unit 8.

FIG. 3A shows the structure when the unevenness output elements 6 are arranged on the image display unit (display layer, display panel) 9. In this case, the unevenness output elements 6 are formed of a material that allows an image below the elements to be seen through using an existing technique that has already been explained using FIGS. 2A and 2B. FIG. 3B shows the structure when the unevenness output elements 6 are arranged under the image display unit (display layer, display panel) 9. The image display unit 9 is formed of a flexible material such as an organic EL (electroluminescence) display or the like. The image display unit 9 deforms in correspondence with deformation of the unevenness output elements 6, and the user can recognize uneven deformation by his or her tactile sense. In the structure of FIG. 3B, the unevenness output elements 6 need not be formed of a transparent material.

Figure 4:
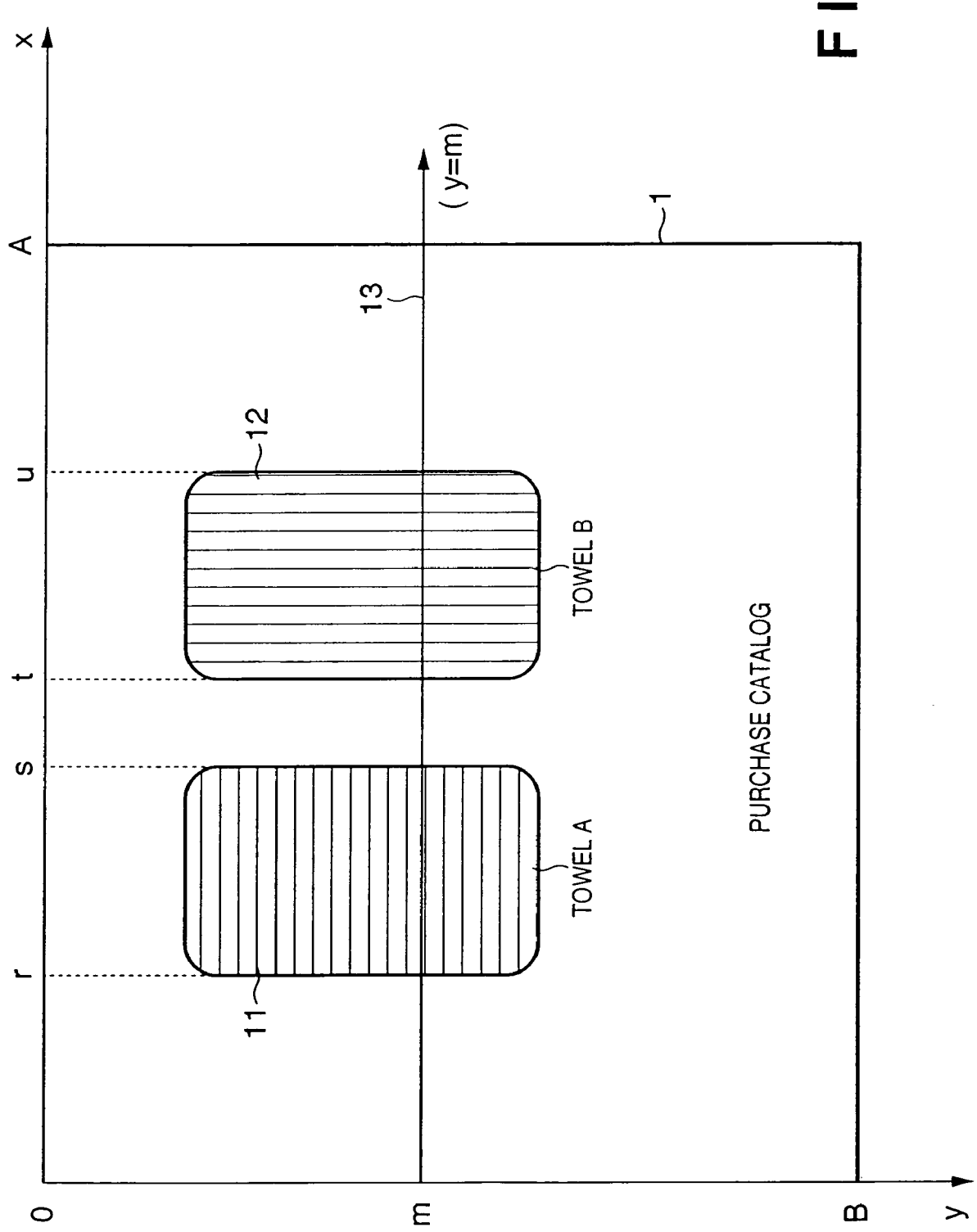
FIG. 4 shows a display example on a hybrid display unit 1 in the first embodiment of the present invention.

FIG. 4 shows a display example on the hybrid display unit 1 of the first embodiment. In FIG. 4, assume that the user displays a purchase electronic catalog (referred to a catalog as below) to purchase a towel, and looks for a desired towel. In FIG. 4, a catalog page on which towels A 11 and B 12 are placed side by side is displayed. Assume that both towels A and B are blue, towel A is formed of a relatively smooth-touch fabric, and towel B is formed of a rough-touch fabric. The conventional display device can display the colors of towels but cannot display the roughness of the fabric surfaces. For this reason, the user cannot distinguish the fabrics of towels A and B on the displayed image, but the hybrid display unit 1 of this embodiment allows the user to easily and adequately distinguish towels A and B. This will be described in detail below.

Figure 5:
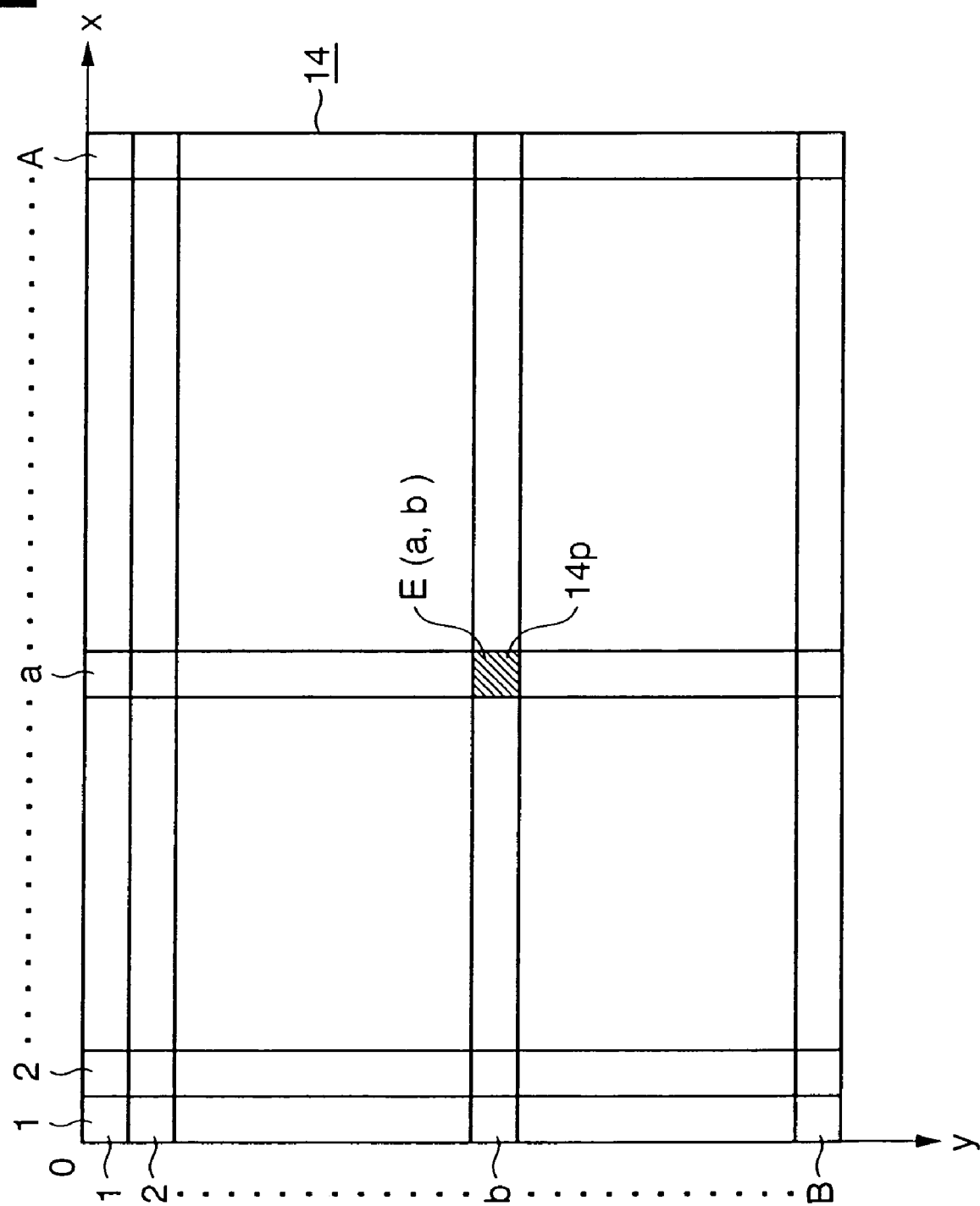
FIG. 5 is a view for explaining the unevenness level used to control the uneven state of each unevenness output element of the unevenness information output unit.

FIG. 5 is a view for explaining the unevenness levels for controlling the uneven states of the unevenness output elements 6 of the unevenness information output unit 8. Reference numeral 14 denotes an unevenness information table; and 14p, a value E(a, b) in the a-th column, b-th row of the unevenness information table. The unevenness information table is an A columns×B rows table corresponding to the unevenness output elements 6 of the unevenness information output unit 8, and an element in the a-th column, b-th row of the unevenness information table stores a value of unevenness levels 0 to 2 of the corresponding unevenness output element 6. Note that the resolution of an image need not always match that of the unevenness information table, and image data or unevenness level information need only be formed so that pixels of the image display unit 9 overlap information output by respective unevenness output elements 6 in correspondence with each other. Image data is stored in the image data storage unit 3 in FIG. 1, and an unevenness information table corresponding to the image data is stored in the unevenness information storage unit 2.

Figure 6:
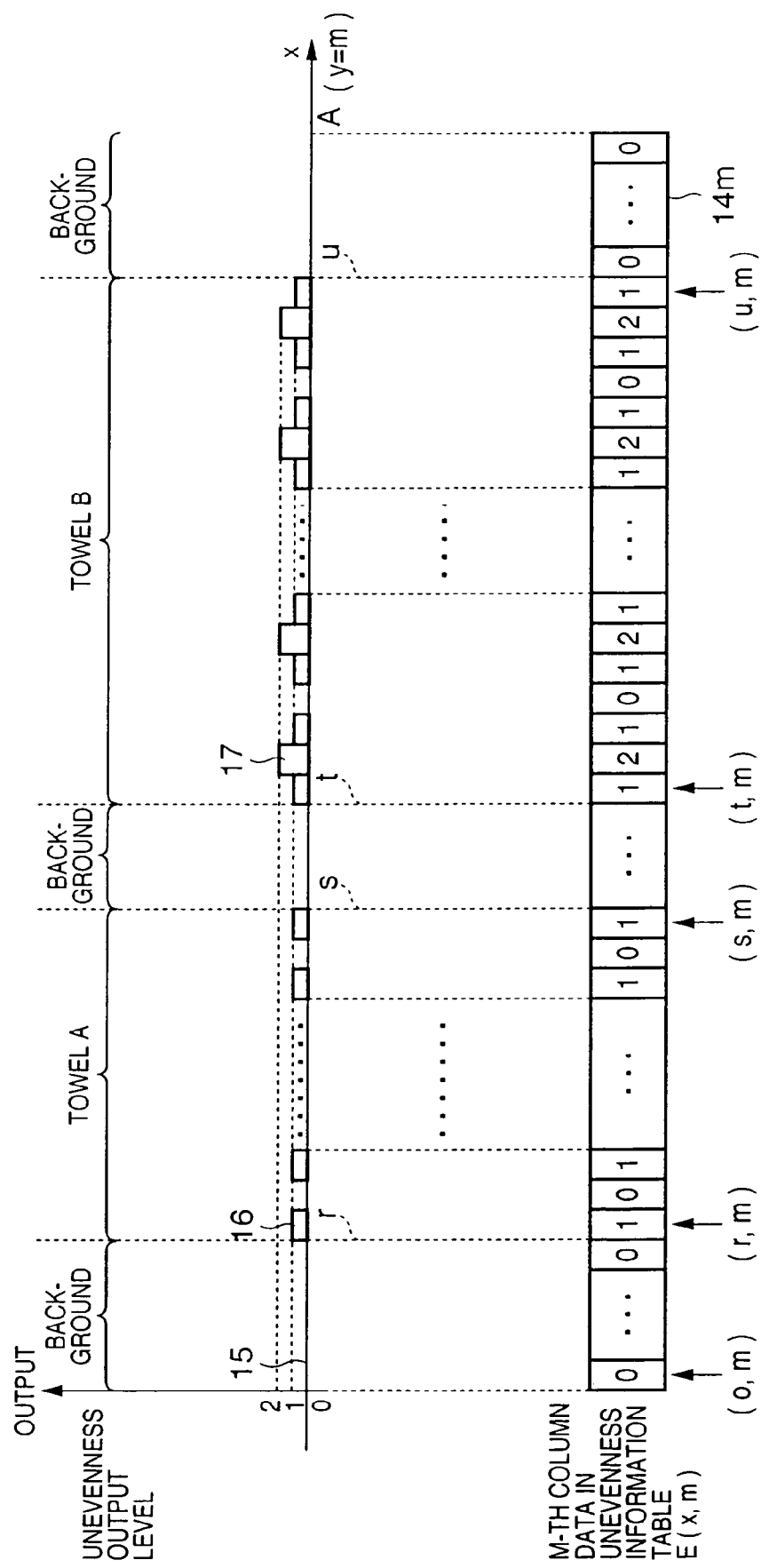
FIG. 6 shows an example of unevenness level information in an unevenness information table, and the output state of the unevenness information output unit.

FIG. 6 shows an example of the unevenness level information of the unevenness information table, and the output state of the unevenness information output unit 8. FIG. 6 shows an example corresponding to the position of line m (13) in FIG. 4. Assume that the position of line m in FIG. 4 corresponds to the m-th row of the unevenness information table 14 in the vertical direction. In FIG. 6, reference numeral 14m denotes data E(x, m) of the m-th row of the unevenness information table corresponding to the position of line m; and 15 (unevenness level 0), 16 (unevenness level 1), and 17 (unevenness level 2), the unevenness output states of the unevenness information output unit 8 based on that data. Towel A corresponds to unevenness output elements r to s, and towel B corresponds to unevenness output elements t to u. A portion (background) other than towels A and B is flat in this embodiment, and all "0"s are set in the unevenness information table. In a portion of towel A, 1, 0, 1, . . . are set. In a portion of towel B, 1, 2, 1, 0, 1, 2, 1, 0, . . . are set. The shapes of the unevenness output elements 6 deform in correspondence with these values to express the unevenness of the relatively smooth-touch fabric of towel A and that of the rough-touch fabric of towel B, as shown in FIG. 6.

Figure 7:
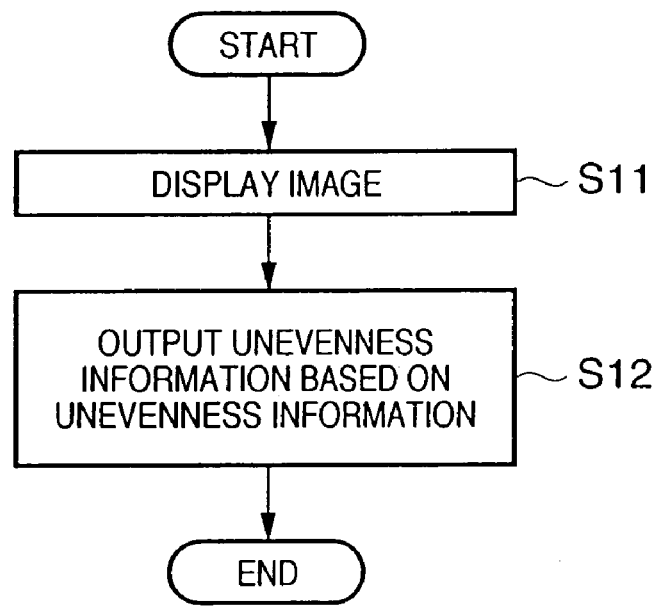
FIG. 7 is a flow chart showing the flow of a process associated with image display in the unevenness information output unit.

FIG. 7 is a flow chart showing the flow of a process associated with image display shown in FIG. 4 in the unevenness information output unit 8. The user has designated beforehand the page on the display screen of FIG. 4 from the catalog by operating the input unit 5. Image data and its unevenness output information is stored in the catalog. As a result, image data of the page designated by the user is stored in the image data storage unit 3, and its unevenness output information is stored in the unevenness information storage unit 2. Then, the process shown in FIG. 7 is executed. An image is displayed on the image display unit 9 of the hybrid display unit 1 on the basis of the image data in the image data storage unit 3 (step S11), and each unevenness level information is output to the unevenness information output unit 8 of the hybrid display unit 1 on the basis of the unevenness level information in the unevenness information table (step S12). With this process, the user can observe image information of towels A and B, and can simultaneously confirm texture impression, i.e., whether the towel fabric is smooth or rough. Hence, the user can adequately select a desired towel from the image.

In this embodiment, each element 14p of the unevenness information table 14 has one-to-one correspondence with the unevenness output element 6. However, in the present invention, they need not always have one-to-one correspondence. When the respective elements of the unevenness information table 14 do not have one-to-one correspondence with the unevenness output elements 6, coordinate conversion (enlargement/reduction) may be made, so that one element of the unevenness information table 14 corresponds to a plurality of unevenness output elements 6 or a representative value (e.g., average value) of a plurality of elements of the unevenness information table 14 corresponds to one unevenness output element. In this way, even when the number of elements of the unevenness information table 14 is different from the number of unevenness output elements 6, the effect of the present invention can be assured.

In this embodiment, the unevenness output level of the portion corresponding to the background where no object (towel) is displayed is set at 0, and the uneven states of towels A and B are output using unevenness output levels 0 to 2 (FIG. 6). Therefore, towels A and B are output in a convex pattern with respect to the background. However, when the uneven state of an object surface need be expressed in a concave pattern, the unevenness output level of the portion corresponding to the background is set at 2, and the uneven state of the object is set using unevenness output levels 0 to 2. In this way, the shape of the object surface can be output in a concave pattern with respect to the background using the same arrangement as in this embodiment.

<Second Embodiment>

Figure 8:
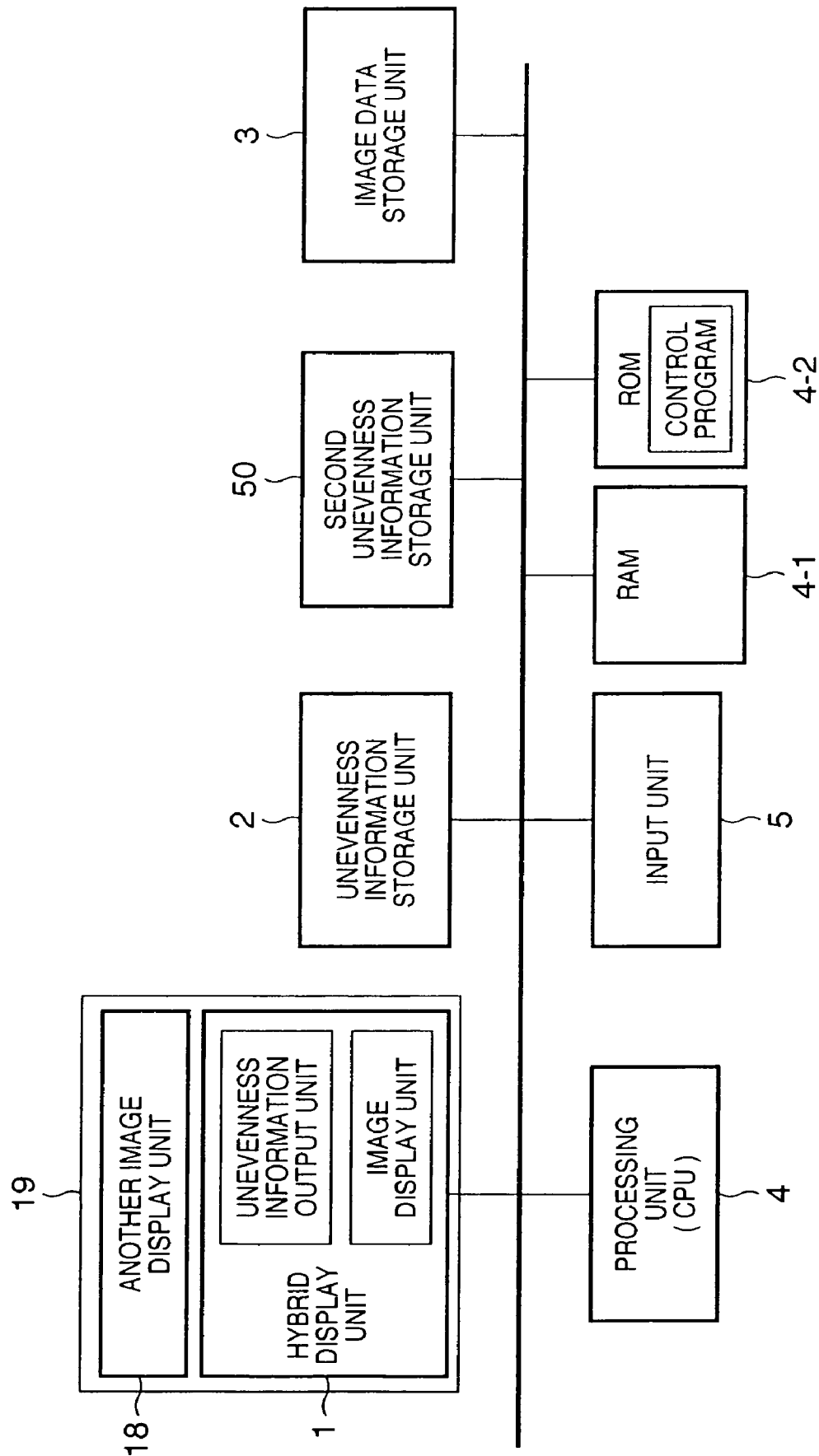
FIG. 8 is a block diagram showing the system arrangement according to the second embodiment of the present invention.

FIG. 8 is a block diagram for explaining the system arrangement of an information output apparatus according to the second embodiment of the present invention. The system arrangement shown in FIG. 8 is substantially the same as that of the information output apparatus of the first embodiment shown in FIG. 1, except that a display unit 19 is used in place of the hybrid display unit 1 in FIG. 1, and a second unevenness information storage unit 50 used to store unevenness pattern data (to be described later) is added. The same reference numerals in FIG. 8 denote the same parts as in FIG. 1, and a repetitive description thereof will be avoided. The display unit 19 comprises the hybrid display unit 1, and another image display unit 18. The hybrid display unit 1 is the same as that in the first embodiment, and can provide a superimposed output of the image display and unevenness output. The another image display unit 18 can display an image alone.

Figure 9B:
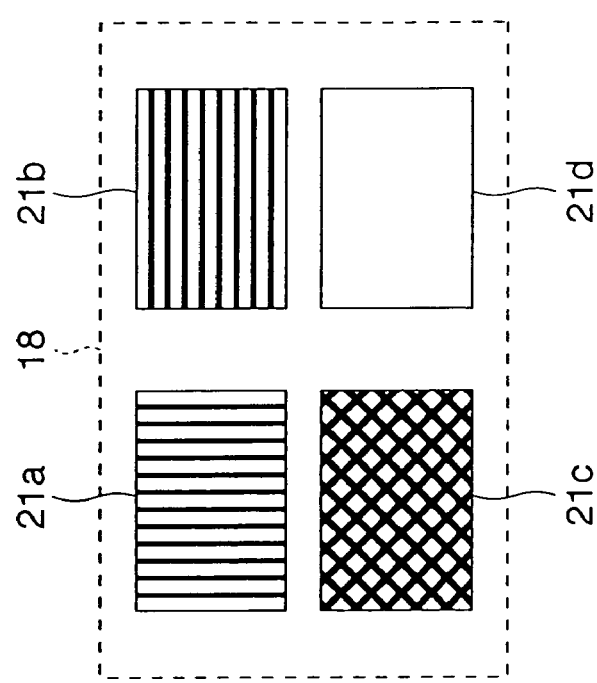
FIG. 9B shows uneven states 21a to 21d of the surfaces of wallpapers 20a to 20d in FIG. 9A.
Figure 9A:
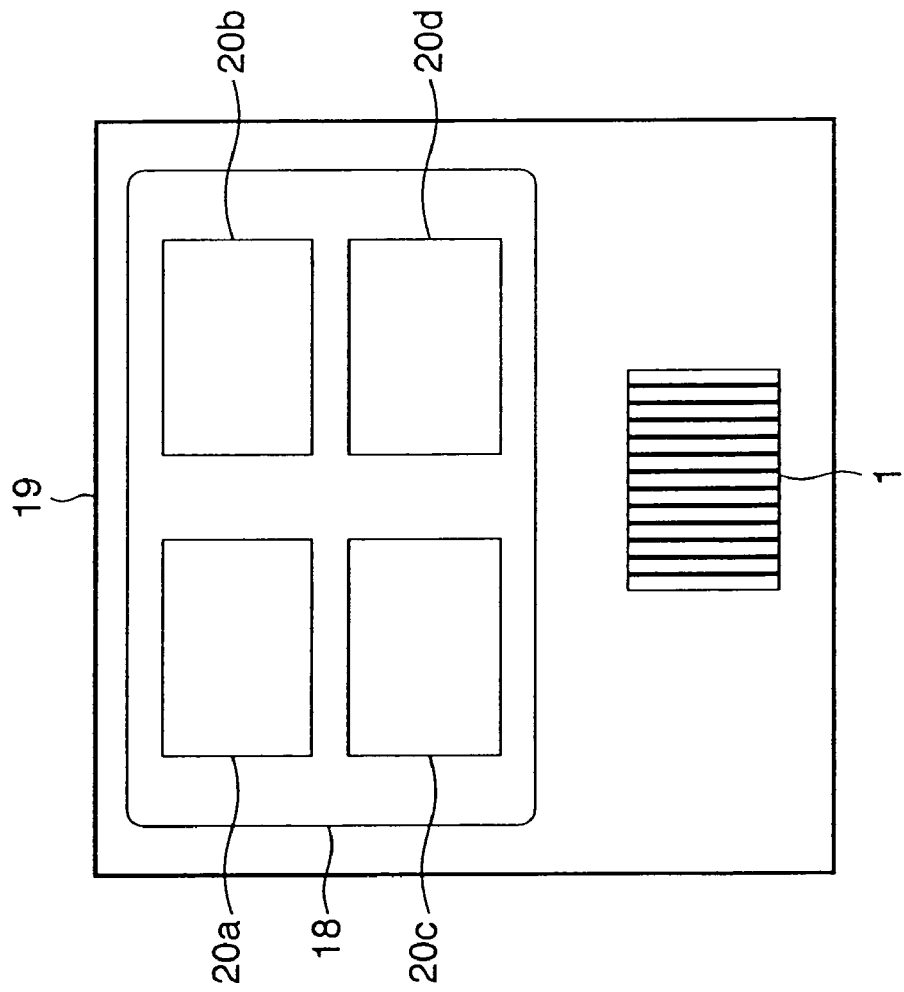
FIG. 9A shows a schematic format of information output by a display unit in the second embodiment of the present invention.

FIG. 9A shows a schematic format of information output by the display unit 19 in the second embodiment. Assume that the user is looking for a desired wallpaper from digitally recorded catalog information to determine a wallpaper to be put up in his or her room. The image display unit 18 displays images of wallpapers 20a, 20b, 20c, and 20d. These wallpapers are all white, but have different surface uneven states and texture impressions. FIG. 9B depicts uneven states 21a to 21d of the surfaces of wallpapers 20a to 20d. That is, the wallpaper 20a has a vertical unevenness pattern, as indicated by 21a, the wallpaper 20b has a horizontal unevenness pattern, as indicated by 21b, the wallpaper 20c has a lattice pattern, as indicated by 21c, and the wallpaper 20d has a smooth surface devoid of any unevenness, as indicated by 21d.

The hybrid display unit 1 in FIG. 9A outputs the unevenness level information of a wallpaper designated by the user from the wallpapers 20a to 20d in accordance with a method to be described in detail later. FIG. 9A shows an example wherein the user designates the wallpaper 20a, and the hybrid display unit 1 outputs the unevenness level information of that wallpaper.

The hybrid display unit 1 of this embodiment has the structure shown in FIG. 3A or 3B as in the first embodiment. Furthermore, the unevenness information output unit 8 has the arrangement shown in FIG. 2A, and each unevenness output element 6 selectively deforms to a convex pattern in a plurality of levels in accordance with the unevenness output level E(a, b) applied to it. In the second embodiment, three unevenness levels 0, 1, and 2 of each element can be set as in the first embodiment. Also, the shape of the unevenness output element 6 changes like 6a, 6b, and 6c in FIG. 2B in accordance with these levels as in the first embodiment. That is, the unevenness output element 6 has the basic state at level 0 and does not deform, as indicated by 6a in FIG. 2B. However, the element 6 deforms at level 1 to a convex shape, as indicated by 6b in FIG. 2B. The element 6 deforms at level 2 to a convex shape by an amount twice that at level 1, as indicated by 6c in FIG. 2B.

Figure 10B:
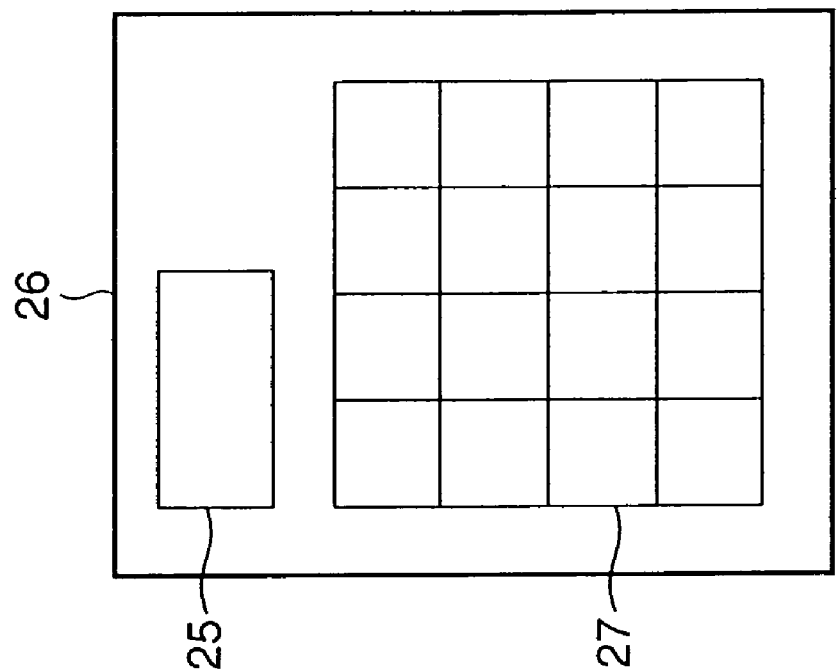
FIG. 10B illustrates the format of uneven pattern information.
Figure 10A:
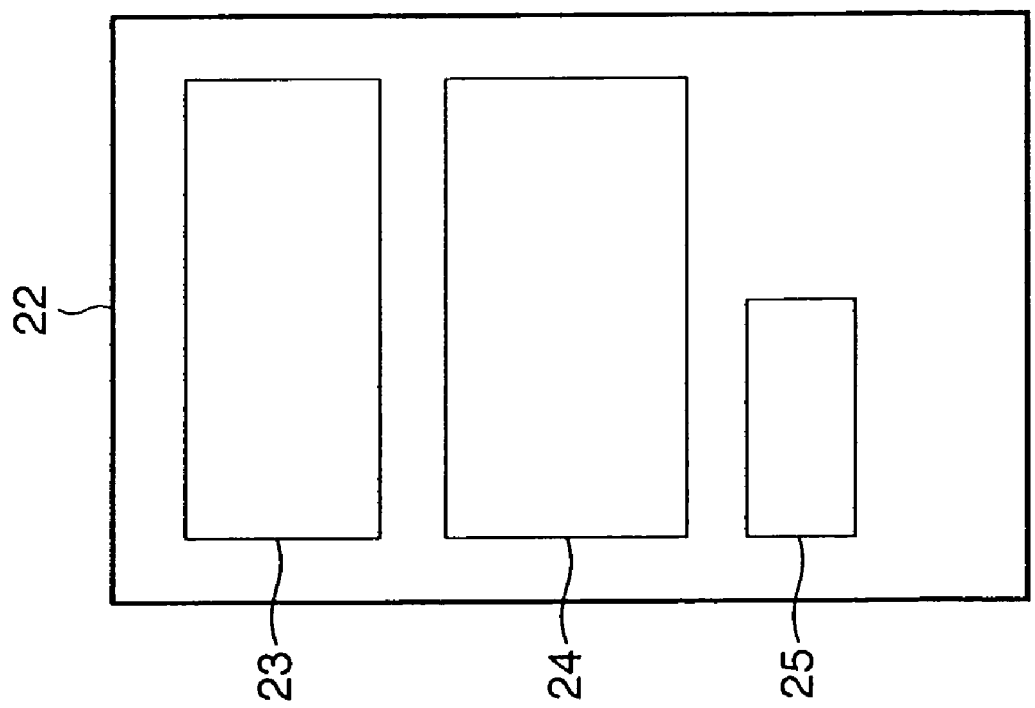
FIG. 10A illustrates the format of catalog information in the second embodiment of the present invention.

FIG. 10A illustrates the format of catalog information in the second embodiment. Reference numeral 22 denotes product data. The product data 22 are registered in correspondence with products. In this embodiment, different product data 22 are registered in correspondence with the wallpapers 20a to 20d. Reference numeral 24 denotes a field that stores an image of a product; and 25, a field that stores an unevenness pattern number corresponding to an unevenness pattern of the material of the product. Reference numeral 23 denotes a header field that stores various kinds of information such as a product name, price, and the like other than the image and unevenness pattern number.

FIG. 10B illustrates the format of unevenness pattern information 26. As shown in FIG. 10B, the unevenness pattern information 26 consists of the unevenness pattern number 25, and unevenness pattern data 27 which stores unevenness information corresponding to that number.

FIG. 11 illustrates an example of the unevenness pattern data 27. Reference numerals 27a to 27d respectively denote unevenness pattern data corresponding to different unevenness pattern numbers. In this embodiment, each unevenness pattern data 27 is defined by a 4×4 matrix, and respective elements of the matrix assume values ranging from 0 to 2, which indicate the unevenness output levels of the unevenness output element 6. In the example shown in FIG. 11, the unevenness pattern data 27a indicates a vertical unevenness pattern; 27b, a horizontal unevenness pattern; 27c, a lattice unevenness pattern; and 27d, a smooth surface pattern free from any unevenness.

Figure 12:
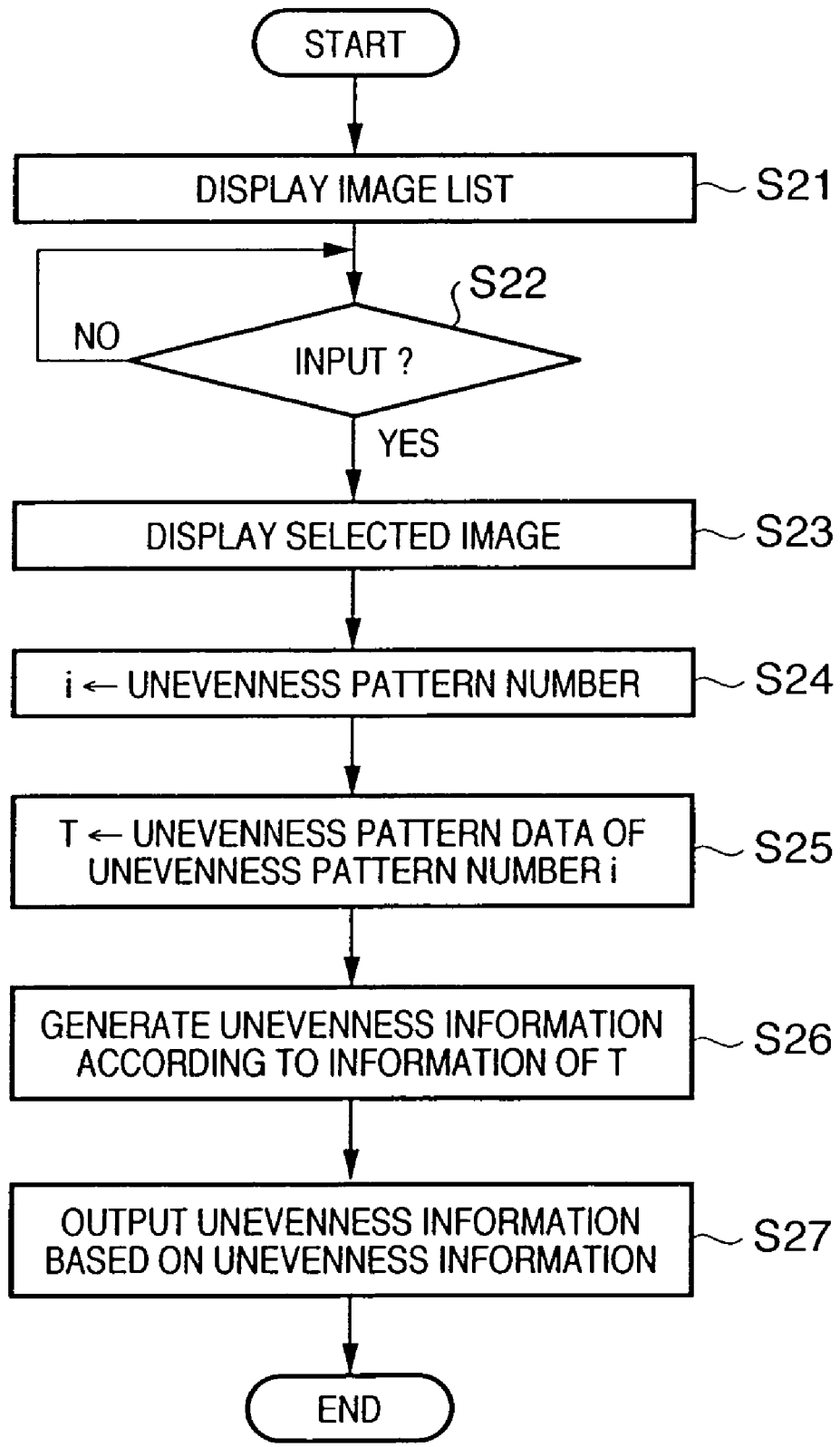
FIG. 12 is a flow chart showing the flow of a process upon outputting information in a hybrid display unit.

FIG. 12 is a flow chart showing the flow of the process upon outputting information shown in FIG. 9A in the hybrid display unit 1. Assume that the user has selected a predetermined number of wallpapers (four wallpapers 20a to 20d in the example of FIG. 9A) to be displayed on the second image display unit 18 from the catalog by operating the input unit 5.

The process shown in the flow chart of FIG. 12 starts, and images corresponding to the plurality of wallpapers selected by the user are displayed as a list on the second image display unit 18 in step S21. The user selects a desired one of the images displayed in the list using a pointing device or the like. In step S22, the control waits for an input of the pointing device or the like, and obtains the wallpaper of user's choice from the displayed list on the basis of information designated by the pointing device or the like. In step S23, the image of the selected wallpaper is displayed on the image display unit of the hybrid image display unit 1.

Unevenness pattern number i of the designated wallpaper is obtained in step S24, and unevenness pattern data T corresponding to unevenness pattern number i is obtained in step S25. In this embodiment, the unevenness pattern data is defined by a 4×4 matrix, as indicated by 27 in FIG. 10B. Subsequently, the values of data T are repetitively applied while shifting the applied position by the size (four in this embodiment) of T in the x- and y-axis directions, thus generating unevenness information for the full output area of the unevenness information output unit 8, in step S26. In step S27, the generated unevenness information is output to the unevenness information output unit of the hybrid display unit 1.

When a material required to manufacture the unevenness information output unit 8 is expensive, the second image display unit 18 used to confirm images, and the hybrid display unit 1 that can provide a superposed output of unevenness information and an image can be separately prepared like in this embodiment. In this way, the uneven state of the surface of a displayed object can be output and its material can be confirmed at lower cost. Since the unevenness information of an object is defined using unevenness pattern data as in this embodiment, an identical unevenness pattern can be easily defined for objects which have different images such as colors and the like but are formed of the same material associated with unevenness.

<Third Embodiment>

Figure 13:
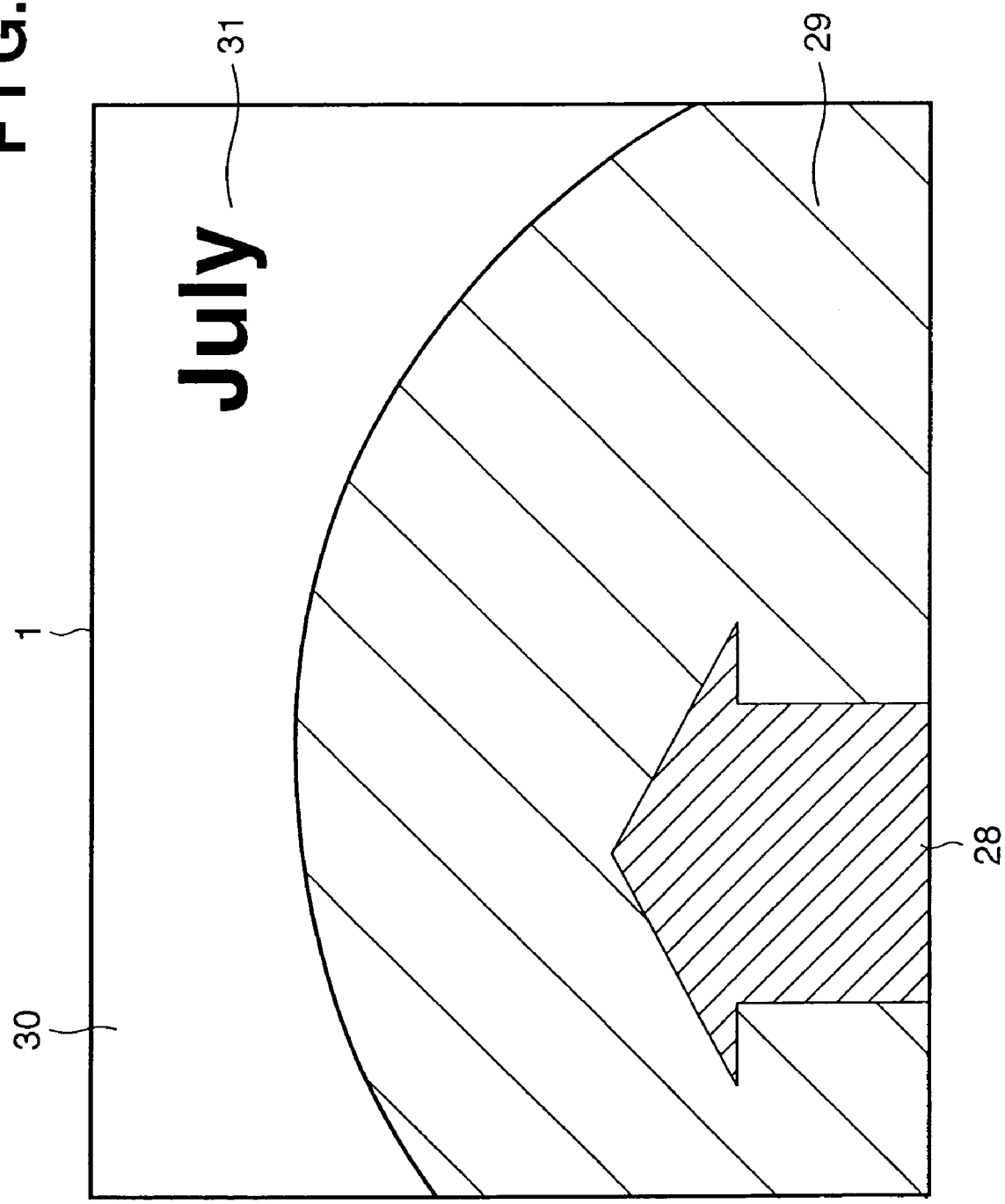
FIG. 13 shows an image display example on a hybrid display unit to explain the third embodiment of the present invention.

FIG. 13 shows an image display example on the hybrid display unit 1 to explain the third embodiment of the present invention. Reference numerals 28 to 31 denote image objects displayed on the hybrid display unit 1. The system arrangement of this embodiment is the same as that of the first embodiment shown in FIG. 1. Also, the hybrid display unit 1 of this embodiment has substantially the same arrangement as that of the first embodiment, except that each unevenness output element 6 can output N+1 unevenness output levels E(a, b)=0 to N. At this time, the shape of each unevenness output element 6 has the basic state at unevenness output level 0, and deforms to a convex pattern by larger amounts as the level increases from 1 to N.

In this embodiment, objects in a normal image are discriminated by their perspective information and other methods, and a superposed output of an image and unevenness information can be output to the hybrid display unit 1, thus providing information with higher reality to the user. Especially, a visually impaired person can obtain perspective information by feeling the image with his or her hand. Hence, this embodiment can provide an excellent information providing function.

Figure 14:
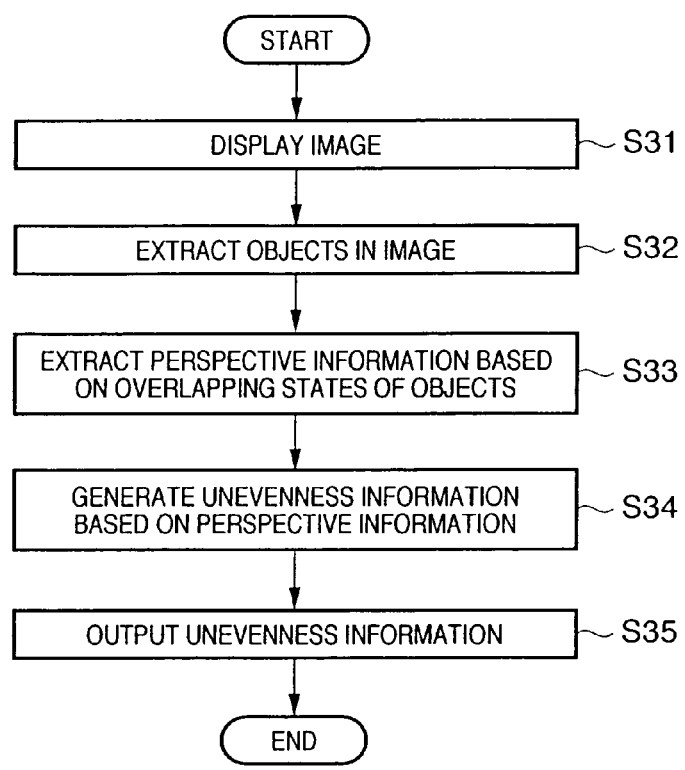
FIG. 14 is a flow chart showing the flow of a process upon outputting information in the hybrid display unit according to the third embodiment of the present invention.

FIG. 14 is a flow chart showing the flow of a process upon outputting information in the hybrid display unit 1 of this embodiment. The user selects in advance an image to be displayed on the hybrid display unit 1. Assume that image information to be selected is stored in the image data storage unit 3. In step S31, the selected image is displayed on the hybrid display unit 1. In step S32, objects are extracted from the image stored in the image data storage unit 3 by a known technique. With this process, objects 28, 29, 30, and 31 are extracted in the example in FIG. 13. Note that the objects 28, 29, 30, and 31 respectively represent a house, mountain, sky, and character string "July". In object extraction, these objects are simply extracted based on their image contours, and their meanings need not be identified. In step S33, perspective information of each extracted object is calculated based on the overlapping state of images by a known method. In this process, the objects 30 and 29 are compared, and it is determined based on color information and the like that the object 30 is farther than the object 29, i.e., is the farthest object. Then, the perspective information of the object 30 is set at level 0, and that of the object 29 is set at level 1. Since the object 28 is located in front of the object 29, its perspective information is set at level 2. A group of objects indicated by 31 (character string "July") is determined as an object which is located in front of the object 30, and its perspective information is set at level 1.

In step S34, the unevenness output levels of the respective unevenness output elements 6 are calculated based on the perspective levels of the respective objects calculated in step S33, and unevenness information is generated based on the calculated values. The unevenness output level is calculated as follows. For example, when the perspective level of an object is 0, the unevenness output level is set to 0; when the perspective level is a maximum value (2 in the example of FIG. 13), the unevenness output level is set to N. When the perspective level assumes a value between the minimum and maximum values, a value is assigned to increase the unevenness output level with increasing perspective level. In step S35, the unevenness output levels (unevenness information) generated in step S34 are output to the unevenness information output unit 8.

According to this embodiment, objects in a normal image are discriminated by their perspective information and other methods, and a superposed output of an image and unevenness information can be output to the unevenness output unit 8, thus providing information with higher reality to the user. Especially, a visually impaired person can obtain perspective information by feeling the image with his or her hand. Hence, this embodiment can provide an excellent information providing function. For example, when characters are drawn within an image, since they are displayed in a convex pattern, their display can be emphasized, and an information output that can be discriminated by tactile sense for a visually impaired person can be realized.

As described above, according to the embodiments of the present invention, texture impression based on the uneven shape of the object surface can be output as three-dimensional unevenness information together with image information of that object, and objects can be easily discriminated by their different texture impressions.

Embodiments of the present invention will be listed below.

(Embodiment 1) An information output apparatus comprises a display panel for displaying an image, an unevenness output element group which is arranged to be in contact with a surface of the display panel, and displays an unevenness level of the image, a memory for storing unevenness information of the image, and a control unit for controlling the unevenness level of the image by controlling voltage values to be applied to the unevenness output elements within a region of the image displayed on the display panel on the basis of the unevenness information of the image stored in the memory.

(Embodiment 2) An information output apparatus comprises a first display panel for displaying a plurality of images, a second display panel for displaying an image selected from the images displayed on the first display panel, an unevenness output element group which is arranged to be in contact with a surface of the second display panel, and displays an unevenness level of the selected image, a memory for storing unevenness information of the image, and a control unit for controlling the unevenness level of the image by extracting unevenness information corresponding to the selected image from the memory, and controlling voltage values to be applied to the unevenness output elements within a region of the image displayed on the second display panel on the basis of the extracted unevenness information.

(Embodiment 3) An information output apparatus comprises a display panel for displaying an image, a generation unit for extracting a plurality of image objects included in the image displayed on the display panel, identifying a perspective relationship among the extracted image objects, and generating unevenness information of each image object on the basis of the identified perspective relationship, an unevenness output element group which is arranged to be in contact with a surface of the display panel, and displays an unevenness level of the image, and a control unit for controlling the unevenness level of the image by controlling voltage values to be applied to the unevenness output elements within a region of the image displayed on the panel on the basis of the unevenness information generated by the generation unit.

(Embodiment 4) In the information output apparatus of embodiment 1, the unevenness output element group deforms to a convex shape with respect to the surface of the display panel by different deformation amounts in correspondence with the voltage values applied by the control unit.

(Embodiment 5) In the information output apparatus of embodiment 2, the unevenness output element group deforms to a convex shape with respect to the surface of the second display panel by different deformation amounts in correspondence with the voltage values applied by the control unit.

(Embodiment 6) In the information output apparatus of embodiment 3, the unevenness output element group deforms to a convex shape with respect to the surface of the display panel by different deformation amounts in correspondence with the voltage values applied by the control unit.

(Embodiment 7) In the information output apparatus of embodiment 1, the display panel is arranged on an upper surface of the unevenness output element group, an image displayed on the display panel can be directly identified, and the display panel deforms in correspondence with deformation of the unevenness output element group.

(Embodiment 8) In the information output apparatus of embodiment 2, the second display panel is arranged on an upper surface of the unevenness output element group, an image displayed on the second display panel can be directly identified, and the second display panel deforms in correspondence with deformation of the unevenness output element group.

(Embodiment 9) In the information output apparatus of embodiment 3, the display panel is arranged on an upper surface of the unevenness output element group, an image displayed on the display panel can be directly identified, and the display panel deforms in correspondence with deformation of the unevenness output element group.

(Embodiment 10) In the information output apparatus of embodiment 1, the unevenness output element group is formed of a transparent material, and the unevenness output element group is arranged on an upper surface of the display panel, and an image displayed on the display panel is identified via the transparent unevenness output element group.

(Embodiment 11) In the information output apparatus of embodiment 2, the unevenness output element group is formed of a transparent material, and the unevenness output element group is arranged on an upper surface of the second display panel, and an image displayed on the second display panel is identified via the transparent unevenness output element group.

(Embodiment 12) In the information output apparatus of embodiment 3, the unevenness output element group is formed of a transparent material, and the unevenness output element group is arranged on an upper surface of the display panel, and an image displayed on the display panel is identified via the transparent unevenness output element group.

(Embodiment 13) A method of controlling an information output apparatus which comprises a display panel for displaying an image, an unevenness output element group which is arranged to be in contact with a surface of the display panel, and displays an unevenness level of the image, and a memory for storing unevenness information of the image, comprises a step of reading out the unevenness information of the image from the memory, and a control step of controlling voltage values to be applied to the unevenness output elements within a region of the image displayed on the display panel on the basis of the readout unevenness information of the image.

(Embodiment 14) A control program for controlling an information output apparatus which comprises a display panel for displaying an image, an unevenness output element group which is arranged to be in contact with a surface of the display panel, and displays an unevenness level of the image, and a memory for storing unevenness information of the image, comprises a program code of a step of reading out the unevenness information of the image from the memory, and a program code of a control step of controlling voltage values to be applied to the unevenness output elements within a region of the image displayed on the display panel on the basis of the readout unevenness information of the image.

Note that the present invention may be applied to either a system constituted by a plurality of devices (e.g., a host computer, interface device, reader, printer, and the like), or an apparatus consisting of a single equipment (e.g., a copying machine, facsimile apparatus, or the like).

The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may-be implemented by some or all of actual processing operations executed by a CPU or the like arranged in a function extension board or a function extension unit, which is inserted in or connected to the computer, after the program code read out from the storage medium is written in a memory of the extension board or unit. As described above, a hybrid display unit of an information output apparatus of the present invention has a structure formed by overlaying, e.g., a display panel used to display an image, and an unevenness output element group used to output the unevenness level of that image, and voltage values to be applied to respective unevenness output elements of the unevenness output element group are determined on the basis of, e.g., unevenness information stored in a memory. Therefore, material differences (smooth or rough touch) of images displayed on the display panel can be realized by touching unevenness output by the unevenness output elements.

According to the present invention, tactile information or the like corresponding to the surface state of an object can be output as three-dimensional information together with image information, and the user can easily discriminate the surface material or the like of an image object in the image information.

As many apparently widely different embodiments of the present invention can be made without departing from the spirit and scope thereof, it is to be understood that the invention is not limited to the specific embodiments thereof except as defined in the claims.

What is claimed is:

1. An information output apparatus comprising:
an image display unit for displaying a plurality of images of objects;
a hybrid display unit for providing a superimposed output of both an unevenness level and an image of an object selected from the plurality of images of objects displayed on said image display unit;
unevenness output elements which are arranged to be in contact with a surface of said hybrid display unit, for exhibiting an unevenness level of the object of the selected object;
a memory for storing unevenness information in accordance with the images of the objects; and
a control unit for reading unevenness information corresponding to the selected image of the object out of said memory and controlling the unevenness level of said elements by controlling voltage values to be applied to said elements within a region of the image of the object displayed on said hybrid display unit on the basis of the read unevenness information.

2. The apparatus according to claim 1, wherein said unevenness output elements deform to a convex shape with respect to the surface of said hybrid display unit by different deformation amounts in correspondence with the voltage values applied by said control unit.

3. The apparatus according to claim 1, wherein said hybrid display unit is arranged on an upper surface of said unevenness output element group-elements, an image displayed on said hybrid display unit can be directly identified, and said hybrid display unit deforms in correspondence with deformation of said unevenness output-elements.

4. The apparatus according to claim 1, wherein said unevenness output elements are formed of a transparent material, and
said unevenness output elements are arranged on an upper surface of said hybrid display unit, and an image displayed on said hybrid display unit is identified via said transparent unevenness output elements.

* * * * *